March 6, 1945.  A. J. KLOSE  2,370,801
AIRPLANE WING STRUCTURE
Filed May 14, 1941   8 Sheets-Sheet 1
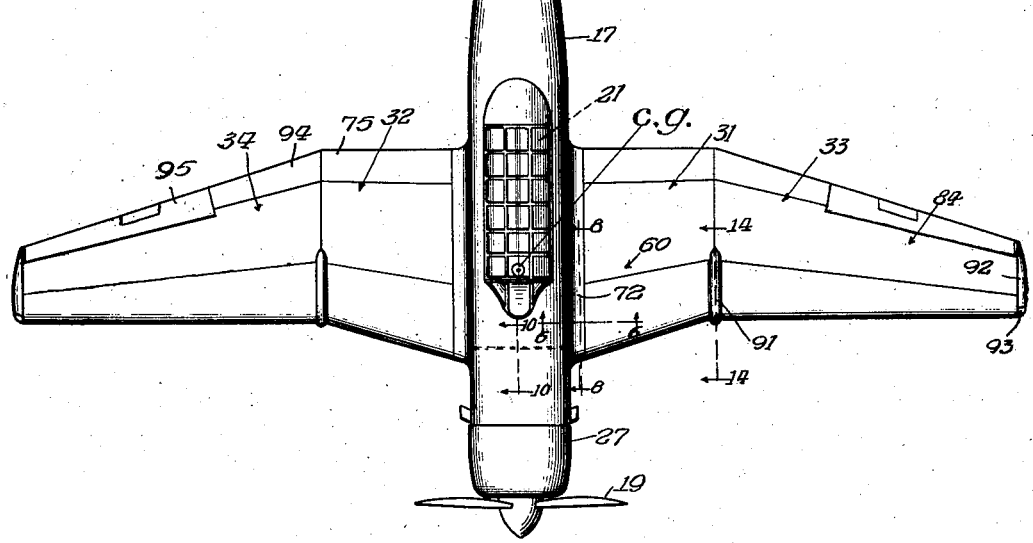
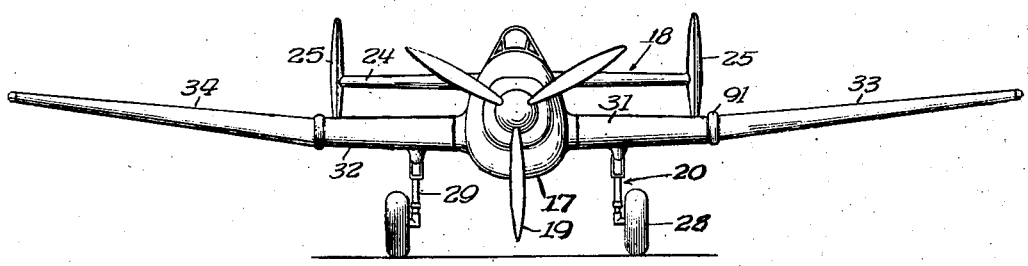
Inventor
Alfred J. Klose
By Fred Gerlach
Atty

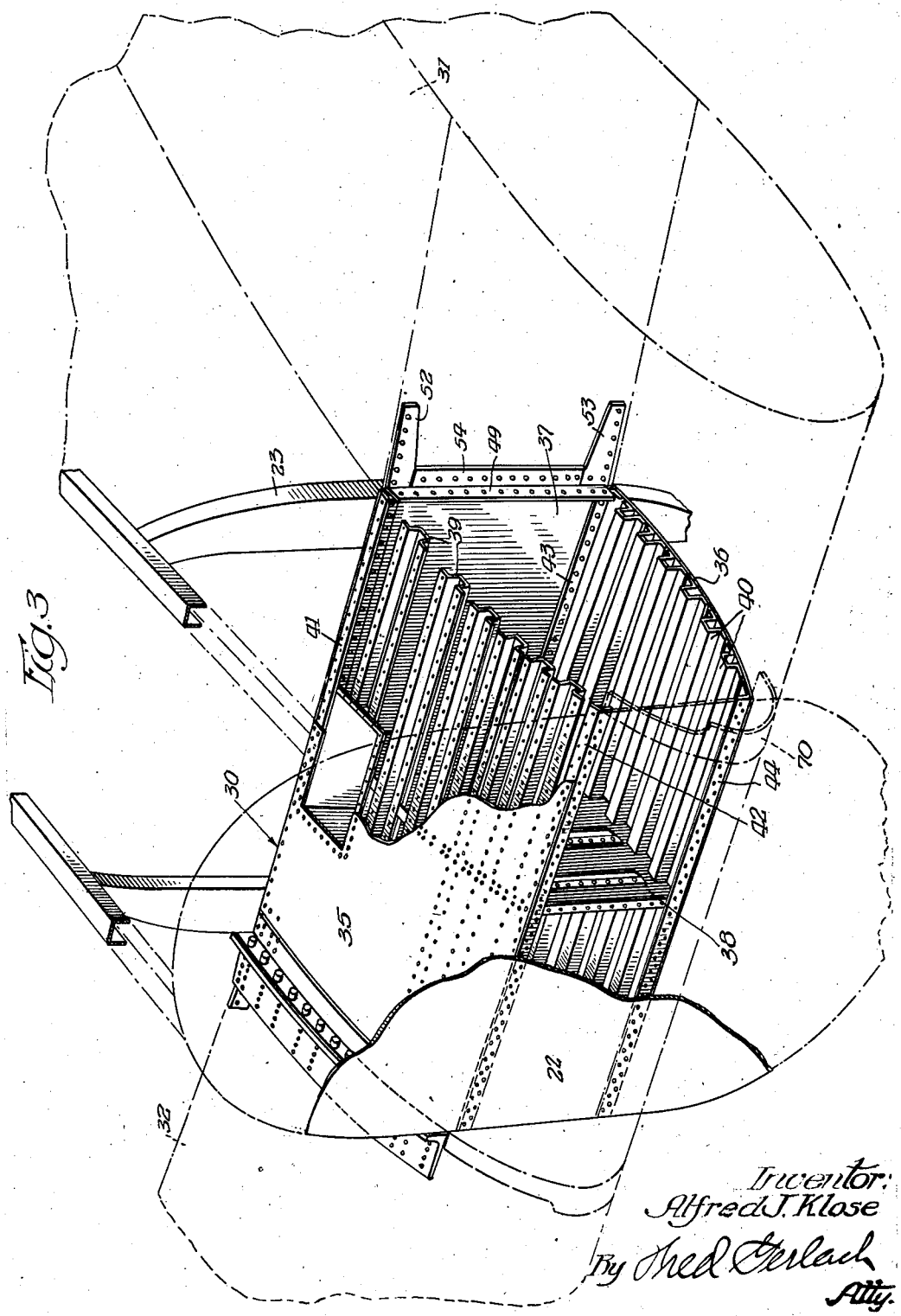

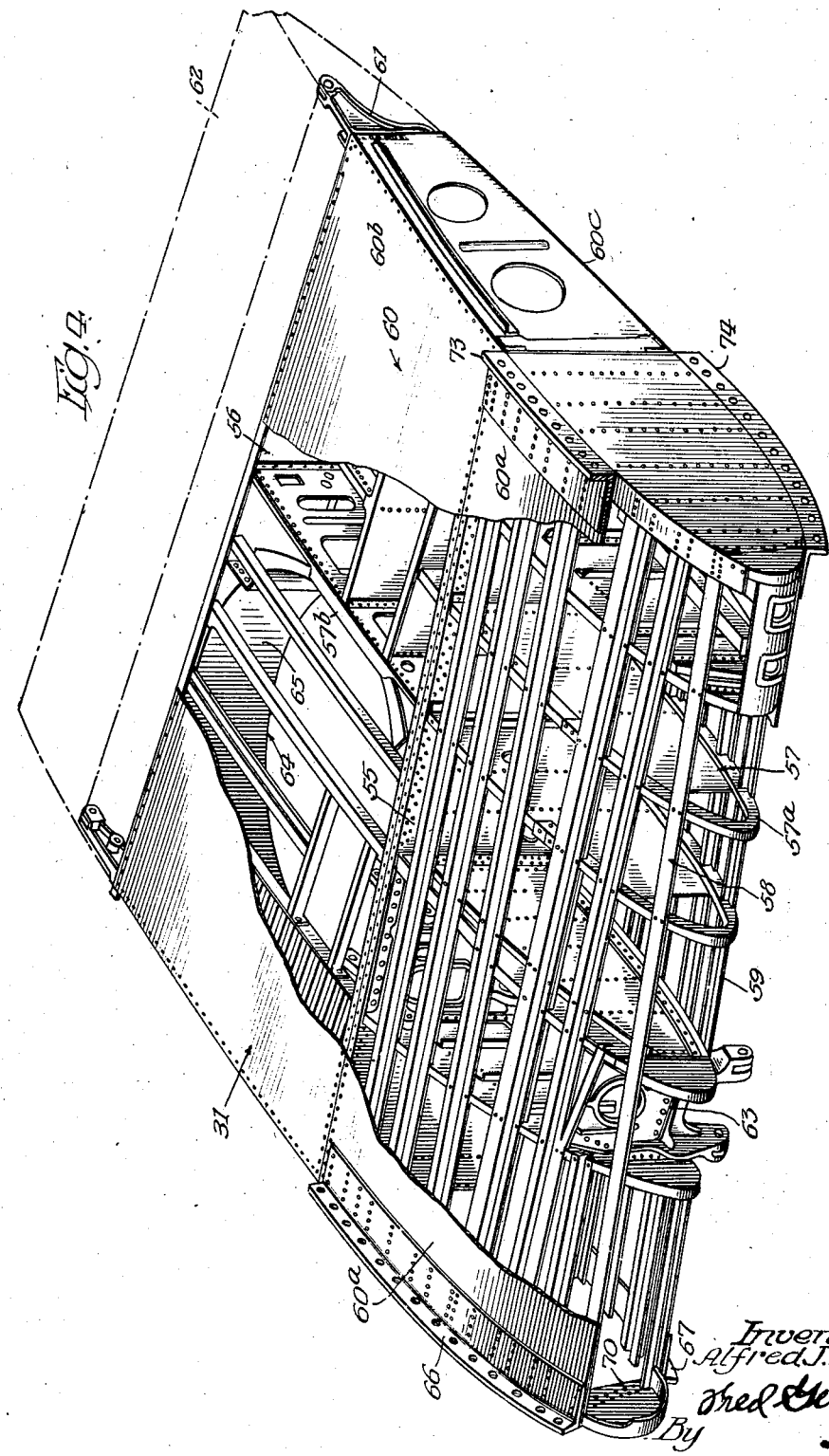

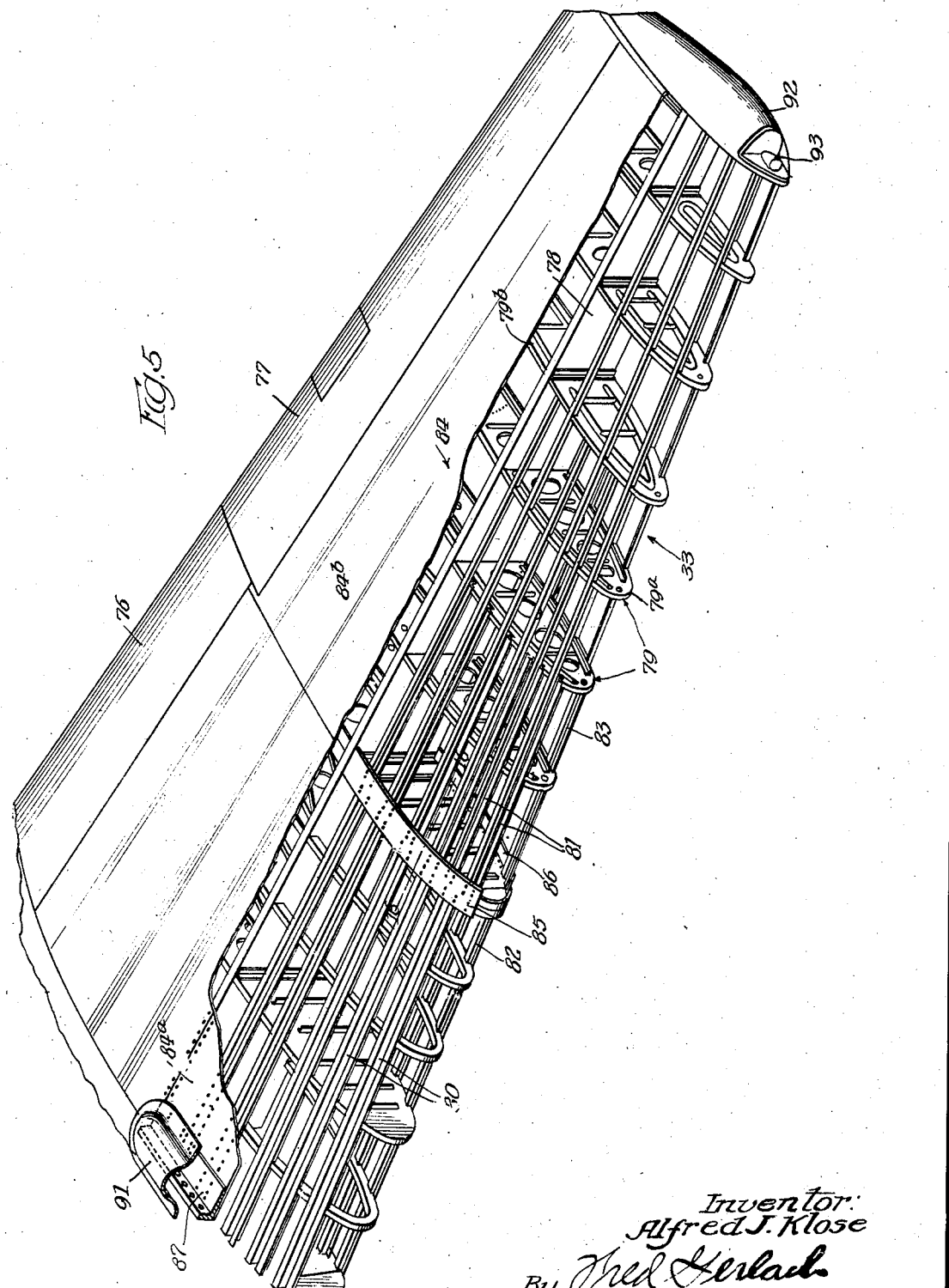

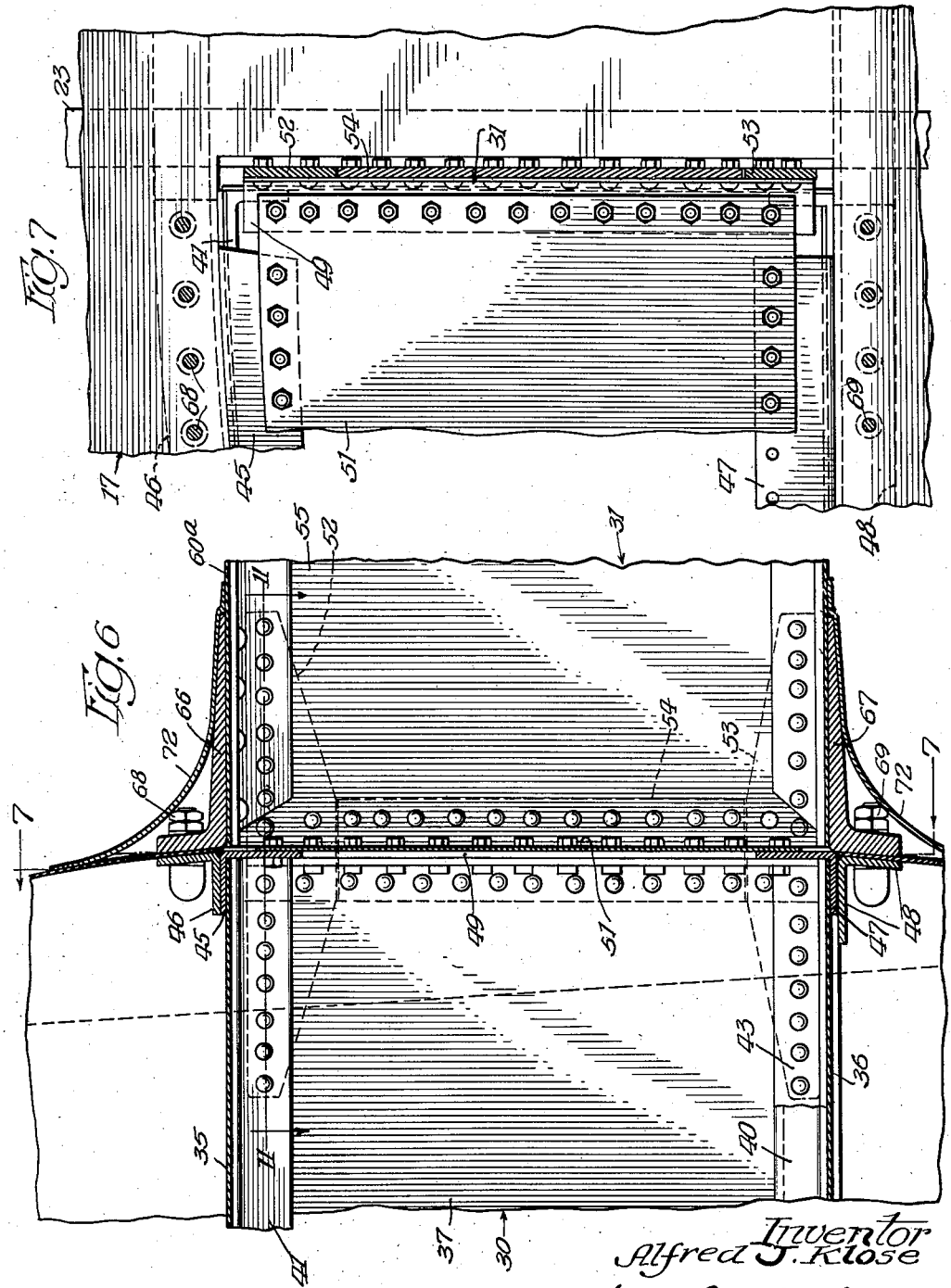

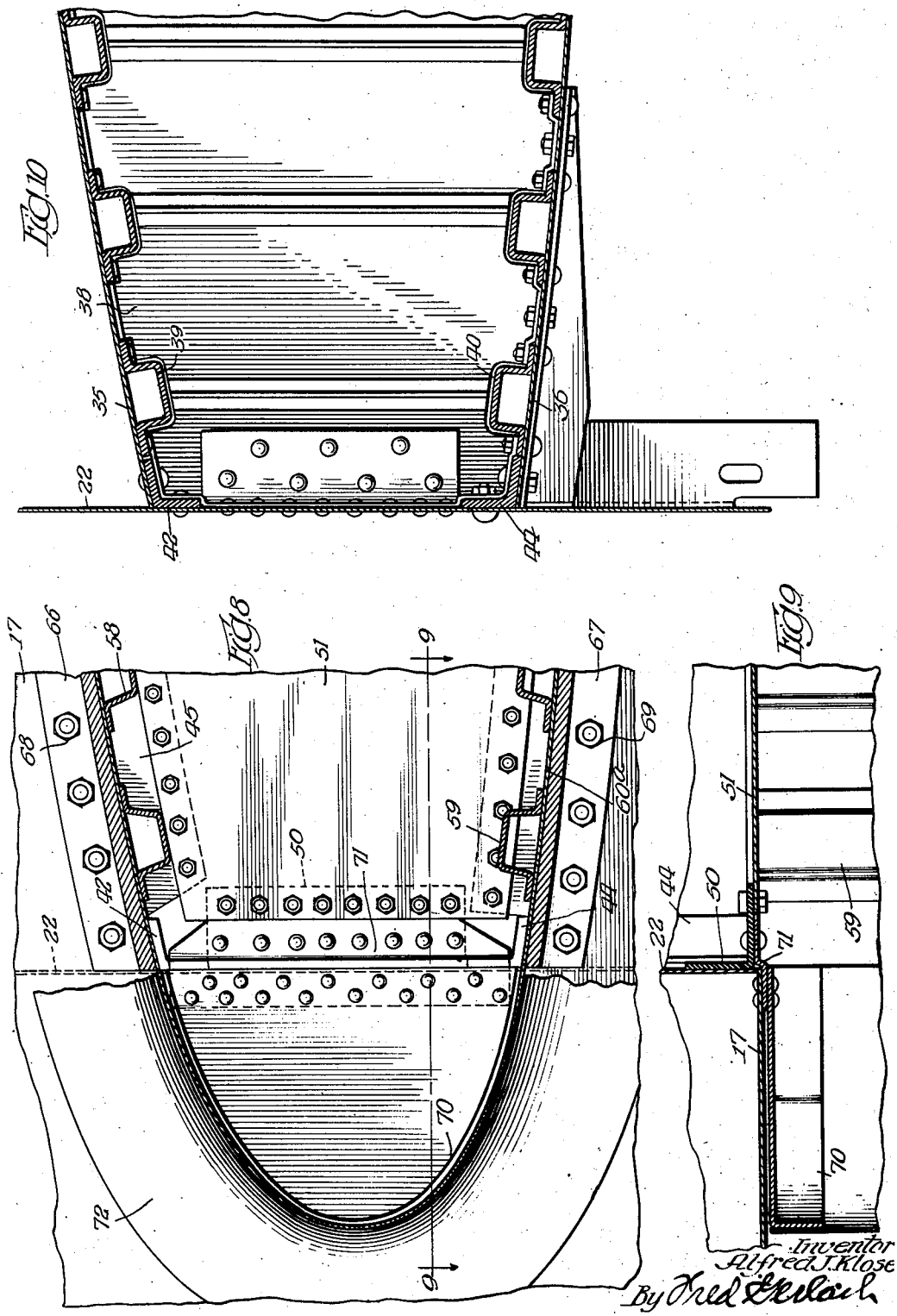

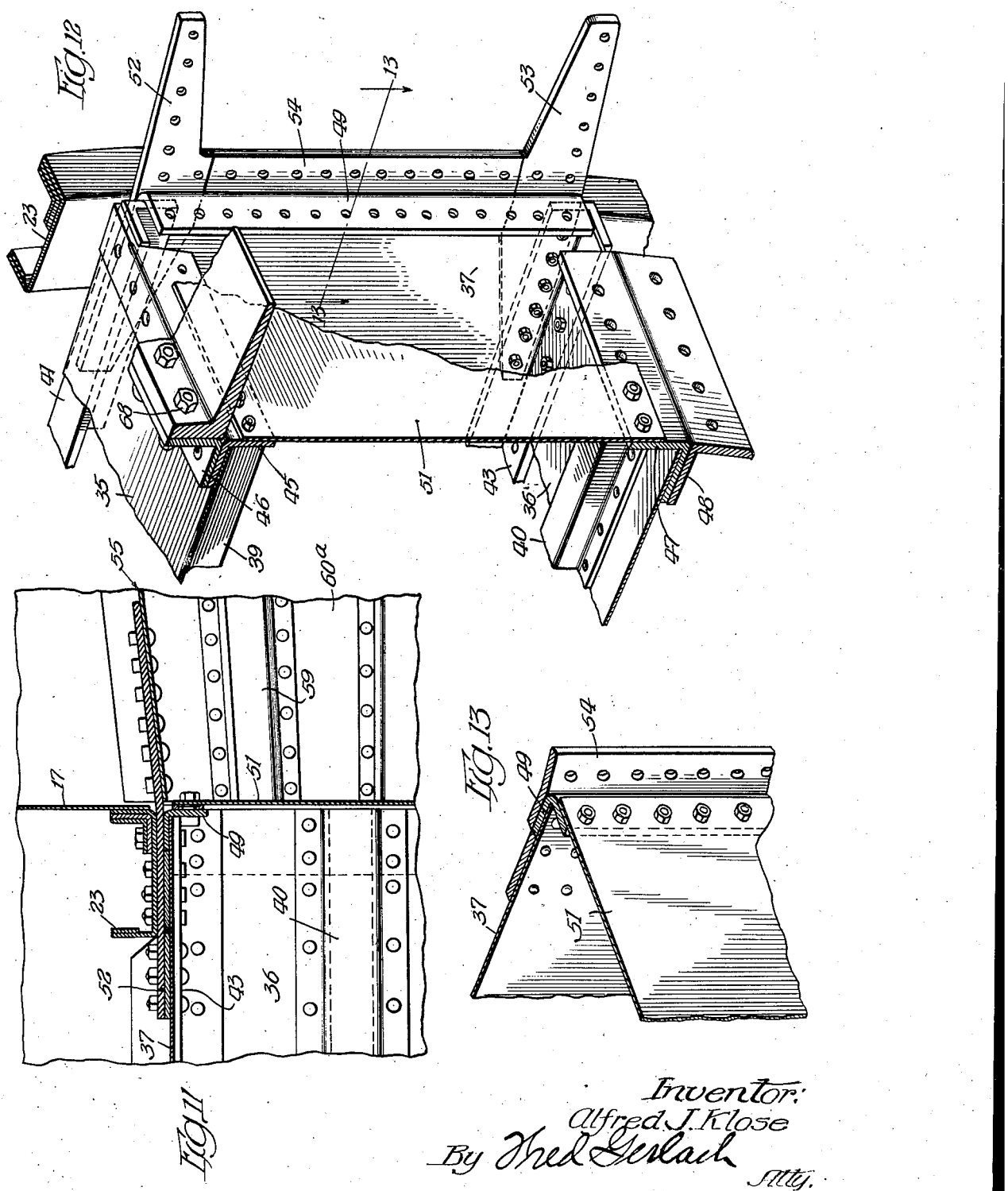

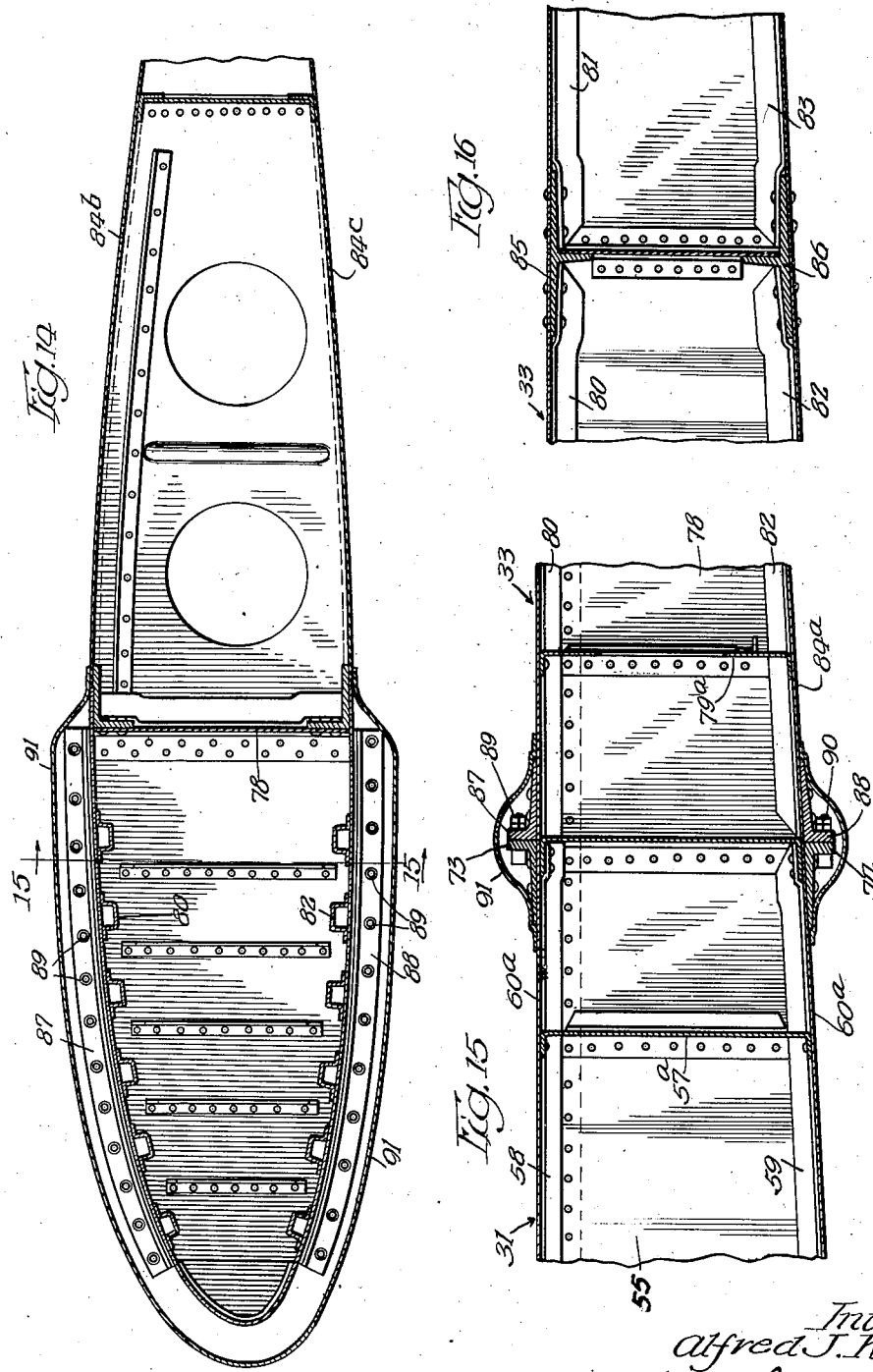

UNITED STATES PATENT OFFICE 2,370,801

AIRPLANE WING STRUCTURE

Alfred J. Klose, Inglewood, Calif., assignor, by mesne assignments, to Consolidated Vultee Aircraft Corporation, a corporation of Delaware Application May 14, 1941, Serial No. 393,322

19 Claims. (Cl. 244—123)

The present invention relates generally to wing structures for airplanes. More particularly the invention relates to that type of airplane wing structure which comprises a pair of complemental side parts which project outwardly from the sides of the airplane fuselage and have their primary load carrying structural elements extending along the leading edges thereof and joined together within the fuselage.

In a conventional or standard wing structure of this type the leading edges of the side parts are straight and generally extend at right angles to the sides or longitudinal center line of the fuselage. In addition inboard or fuselage enclosed parts of the load carrying structural elements are necessarily of complicated design or construction in order properly to connect the side parts of the wing structure, and are generally located about, or in close proximity to, the center of gravity of the airplane with which the structure is used or employed due to the shaping or design of the side parts. In connection with a conventional or standard airplane wing structure of the type under consideration two practices are open to the manufacturer. The first practice comprehends locating the load carrying space or passengers' compartment in the airplane fuselage wholly aft of, or behind, the inboard part of the wing structure regardless of whether the airplane is of the high-wing, mid-wing, or low-wing variety. Such practice, although it permits the use of a load carrying space or passengers' compartment of full head room from one end to the other in a fuselage of minimum height, is objectionable for the reason that it is necessary to locate or posliton the load carrying space or passengers' compartment so far behind the center of gravity of the airplane that the airplane does not have the most desirable flight characteristics. The second practice comprehends locating or arranging the load carrying space or passengers' compartment properly or most advantageously as far as the center of gravity is concerned by arranging the inboard part of the wing structure either across the upper portion of the space or compartment, as in the case of a high-wing airplane, or across the lower portion of the space or compartment, as in an airplane of the low-wing variety. With the second mentioned practice it is either necessary to have the load carrying space or passengers' compartment of reduced or restricted height at the point where it passes the inboard part of the wing structure or it is necessary, if a space or compartment of full head height from end to end is desired, either to locate the inboard part in an undesirable projection on the top or bottom of the fuselage or to employ a fuselage of abnormal height. In neither of the practices heretofore mentioned is it possible, when a conventional or standard wing structure is employed, to have the load carrying space or passengers' compartment properly or most advantageously disposed with respect to the center of gravity of the airplane while at the same time provided with full head room from end to end in a fuselage of minimum height.

The primary or principal object of the instant invention is to provide an airplane wing structure which is an improvement upon, and has certain advantages over, conventional or previously designed wing structures of the same general character by reason of the fact that it is so designed and constructed that so far as the airplane with which it is associated is concerned it is possible to have a most favorable or advantageous disposition of the useful load or load carrying space or passengers' compartment with respect to the center of gravity of the airplane while at the same time employing a fuselage of minimum height. In general the improved wing structure is characterized by the fact that the inboard or fuselage enclosed parts of the primary load carrying elements are disposed in front of the center of gravity of the airplane with which the structure is associated, and the inner portions of the leading margins of the side parts of the structure extend or sweep rearwards at an acute angle with respect to the sides of the airplane fuselage. By having the inboard part of the wing structure that is the fuselage enclosed parts of the primary load carrying elements disposed within the fuselage at a point in front of the center of gravity and arranging the inner portions of the leading margins of the side parts of the wing structure so that they extend or sweep rearwards the side parts serve as the proper or desired load supporting media while at the same time it is possible to obtain, as far as the fuselage of the airplane is concerned, a most favorable disposition of the useful load with respect to the center of gravity without increasing the height of the fuselage.

Another object of the invention is to provide a wing structure of the type and character under consideration in which the complemental side parts are reenforced in a novel manner and comprise inner and outer sections of novel design and construction.

A further object of the invention is to provide an airplane wing structure of the last mentioned character in which the inner sections, that is, the sections constituting the inner portions of the side parts, are releasably secured to the outer sections in order that the wing structure as a whole may be readily assembled and dismantled.

A further object of the invention is to provide a wing structure which is generally of new and improved construction and effectively and efficiently fulfills its intended purpose.

Other objects of the invention and the various advantages and characteristics of the present airplane wing structure will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a plan view of an airplane having a wing structure embodying the invention;

Figure 2 is a front view of the airplane illustrating in detail the manner in which the outer sections of the wing structure are angularly disposed with respect to the inner sections in order to provide the desired dihedral;

Figure 3 is a fragmentary perspective of the center section of the wing structure;

Figure 4 is a fragmentary perspective of one of the inner sections;

Figure 5 is a fragmentary perspective of one of the outer sections;

Figure 6 is an enlarged vertical longitudinal section taken on the line 6—6 of Figure 1 and illustrating in detail the manner in which the inner sections of the structure are removably or releasably secured to the inboard section or part;

Figure 7 is a transverse section on the line 7—7 of Figure 6;

Figure 8 is an enlarged vertical transverse section on the line 8—8 of Figure 1;

Figure 9 is a horizontal section taken on the line 9—9 of Figure 8 and illustrating in detail the manner in which the nose pieces at the inner ends of the inner sections of the structure are secured to the front corners of the inboard section of the wing structure;

Figure 10 is an enlarged vertical transverse section taken on the line 10—10 of Figure 1 and disclosing the construction and design of the fore or front portion of the inboard section;

Figure 11 is a horizontal section taken on the line 11—11 of Figure 6 and showing the design and construction of the rear corners of the inboard section or part;

Figure 12 is a fragmentary perspective view of one of the rear corners of the inner section;

Figure 13 is a section on the line 13—13 of Figure 12;

Figure 14 is an enlarged vertical transverse section taken on the line 14—14 of Figure 1 and illustrating in detail the construction of the means whereby the inner and outer sections of the wing structure are releasably or removably secured together;

Figure 15 is a transverse section on the line 15—15 of Figure 14; and

Figure 16 is an enlarged longitudinal section on the line 16—16 of Figure 5.

The airplane which is shown in the drawings includes a wing structure embodying the invention. It is of the single motor low-wing type and comprises in addition to the improved wing structure a fuselage 17, an empennage 18, a propeller 19, and a retractable landing gear 20. The center of gravity of the airplane is denoted by the point marked "c. g." in Figure 1, and is located at a point substantially midway between the top and bottom of the fuselage and approximately midway between the front of the fuselage and the center. The central portion of the fuselage is of minimum height and is shaped to form a compartment 21 for the pilot and other personnel of the airplane as well as the useful load. A canopy, which for the most part is transparent, serves as an enclosure for the top or upper portion of the compartment 21. The front portion of the compartment projects slightly forwards of the center of gravity with the result that there is a most favorable or advantageous disposition of the useful load while at the same time the airplane possesses the maximum or most efficient flight characteristics. The fuselage embodies the usual longerons and tubular skin and embodies at the front a vertical transversely extending fire wall 22 and a pair of laterally spaced uprights (see Fig. 3). The fire wall is in the form of a metallic plate and is located an appreciable distance in front of the center of gravity. The uprights 23 are located behind the fire wall and are at the front end of the compartment 21. The empennage 18 is carried by the rear end of the fuselage, as shown in Figure 1. It is of standard or conventional design and comprises a horizontally extending stabilizer 24, a pair of rudders 25 and a pair of elevators 26. The propeller 19 is located at the front of the fuselage and is driven by an internal combustion engine (not shown) within a cowl 27 which is suitably supported in front of the fire wall 22. The landing gear 20 includes a pair of front wheels 28. These are mounted on stub axles on the distal ends of a pair of hinged arms 29.

The wing structure consists of an inboard section 30, a pair of complemental inner sections 31 and 32 and a pair of complemental outer sections 33 and 34 and constitute the main medium for supporting the airplane during flight. The section 30 is disposed in a horizontal position within, and extends transversely across, the front portion of the fuselage 17. It is positioned or disposed in front of the center of gravity of the airplane and is located between the plate formed fire wall 22 and the uprights 23, as shown in Figure 3. The inner and outer sections 31 and 33 are located at the left hand side of the airplane fuselage 17 whereas the other inner and outer sections, i. e., the sections 32 and 34, are located at the right hand side. The inner sections 31 and 32 extend horizontally and have no dihedral and the outer sections 33 and 34 extend upwards and outwards at an acute angle with respect to the horizontal so that they have a positive dihedral.

The inboard section 30 of the inner structure extends between and serves to cross connect the inner sections 31 and 32. It is of less height than the fuselage and comprises a top wall 35, a bottom wall 36, a rear wall 37, and a central upstanding cross wall 38 together with upper stringers 39 and lower stringers 40. The walls 35, 36, 37 and 38 are formed of any suitable metal in order that the inboard section of the wing structure is in the form of a rigid unit. The central portion of the fire wall 22 serves as a closure for the front of the inboard section 30. The top wall 35 overlies the upper stringers 39 and is provided along the rear margin thereof with an angle bar 41 and along its front margin with an angle bar 42. The angle bar 41 underlies the rear margin of the top wall 30 and embodies a substantially horizontally extending leg and a rear depending leg. The substantially horizontal leg is riveted or otherwise fixedly secured to the top wall and extends from one end of the top wall to the other. The depending leg of the angle bar 41 laps the front face of the upper margin of the rear wall 37 that is riveted to such margin. The angle bar 42 is coextensive with the top wall and embodies an upper substantially horizontally extending leg, and a depending leg. The substantially horizontal leg underlies the bottom face of the front margin of the top wall and is riveted to such margin. The depending leg of the bar 42 laps or abuts against the central portion of the fire wall 22 and is riveted to such portion. The upper stringers 39 of the center portion of the wing structure are of the hat section variety or type and are disposed in parallel and laterally spaced relation. They underlie the top wall and have the side flanges thereof riveted to said top wall 35. The bottom wall 36 underlies the top wall and is held in vertically spaced relation with the top wall by way of the rear wall 37. It is provided along the rear margin thereof with a full length angle bar 43 and embodies along its front margin a full length angle bar 44. The angle bar 43 embodies a substantially horizontally extending bottom leg and an upstanding side leg. The bottom leg overlies and is riveted to the rear margin of the bottom wall 36 and the upstanding side leg fits against the front face of the bottom margin of the rear wall 37 and is riveted to such margin. The angle bar 44 underlies the angle bar 42 and consists of a substantially horizontal bottom leg and an upstanding side leg. The bottom leg overlies the top face of the front margin of the bottom wall 36 and is riveted or otherwise fixedly secured to said margin. The upstanding side leg of the angle bar 42 fits against and is riveted to the central portion of the fire wall 22, as shown in Figure 3. The lower stringers 40 are disposed in laterally spaced relation and are parallel to the upper stringers and the four angle bars 41, 42, 43 and 44. They are of the hat section type or variety the same as the upper stringers 39 and have the side flanges thereof riveted to the bottom wall 36. The cross wall 38 extends between the top and bottom walls 35 and 36 and is positioned midway between the end edges of such walls. It serves as the reenforcing medium for the central portion of the wing structure and has notches or cut-outs in its top and bottom margins for accommodating the upper and lower stringers. At its left hand end the inboard section 30 is provided with a pair of upper angle bars 45 and 46, a pair of lower angle bars 47 and 48, a rear angle bar 49, a front angle bar 50, an end plate 51 and a pair of attaching plates 52 and 53. The upper angle bar 45 overlies the angle bar 47 (see Figure 12) and comprises a substantially horizontal top leg and a depending side leg. The top leg overlies and is riveted or otherwise fixedly secured to the adjacent end margin of the top wall 35 and the depending side leg of the angle bar 45 laps, and extends transversely across, the adjacent ends of the upper stringers 39. The angle bar 46 constitutes a part of the means for securing the inner section 31 of the wing structure to the inboard section 30. It extends from the front margin of the top wall 35 to the rear margin and consists of a substantially horizontal bottom leg and an upstanding side leg. The bottom leg of the angle bar 46 rests upon, and is fixedly secured to, the top leg of the angle bar 45 and the upstanding side leg projects above, and is coplaner with, the depending side leg of the angle bar 45. The lower angle bars 47 and 48 underlie the upper angle bars 45 and 46 and extend from the front margin of the bottom wall 36 to the back margin. The angle bar 47 comprises a substantially horizontal bottom leg and an upstanding side leg. The bottom leg underlies and is riveted or otherwise fixedly secured to the adjacent end margin of the bottom wall and the upstanding side leg of the angle bar 47 laps and extends transversely across the ends of the lower stringers 40 and is vertically aligned with the depending side leg of the upper angle bar 45. The angle bar 48 constitutes another part of the means for removably securing the inner section 31 of the wing structure to the inboard section 30 and consists of a substantially horizontally extending top leg and a depending side leg. The top leg is in lapped relation with, and is suitably secured to, the bottom leg of the angle bar 47 and the depending side leg of the angle bar 48 is vertically aligned with, and projects downwards from, the upstanding side leg of the angle bar 47. The rear angle bar 49 extends substantially vertically and consists of a rear leg and a forwardly extending side leg. The upper end of the rear leg is fixedly secured to the adjacent end of the depending leg of the angle bar 41 and the lower end of the rear leg of the angle bar 49 is bolted, riveted or otherwise fixedly secured to the adjacent end of the upstanding leg of the angle bar 43. The forwardly extending side leg of the angle bar 49 is aligned with the side legs of the angle bars 45 and 47. The front angle bar 50 is located at the front portion of the center section of the wing structure and extends between the top and bottom walls 35 and 36. It is positioned in paralel relation with the rear angle bar 49 and consists of a front leg and a rearwardly extending side leg. The front leg is riveted to the rear face of the fire wall 22 and the side leg is aligned with the side leg of the rear angle bar 49. The end plate 51 serves as a closure for the left hand end of the inboard section 30 and is bolted to the side flanges of the angle bars 45, 47, 49 and 50 (see Figures 6, 7, 8, 9, 11, 12, and 13). The attaching plates 52 and 53 constitute additional parts of the means for removably securing the inner section 31 of the wing structure to the inboard section. The plate 53 overlies the plate 53, as shown in Figure 12, and is horizontally elongated. The inner end of the plate 52 extends lengthwise of, and is bolted to, the adjacent end of the depending leg of the angle bar 41. It is interposed between said leg and one of the uprights 23 of the fuselage 17. The outer end of the plate 52 projects outwards of the adjacent or adjoining side of the fuselage. The plate 53 is horizontally elongated and is vertically aligned with the plate 52. The inner end of the plate 53 extends lengthwise of the adjacent end of the upstanding leg of the angle bar 43. It is bolted or otherwise fixedly secured in place and is interposed between the last mention upstanding leg and the adjacent upright 23. The outer end of the plate 53, like the outer end of the plate 52, projects outwards of the fuselage side.

A vertically elongated gusset type plate 54 extends between the central portions of the attaching plates 52 and 53 and has the inner margin thereof in lapped relation with, and bolted to, the rear leg of the rear angle bar 49. The right hand end of the inboard section 30 is constructed in the same manner as the left hand end. Both ends of the inboard section communicate with the exterior of the fuselage by way of opening or apertures in the sides of the fuselage 17.

The inner section 31 of the wing structure is in the form of a unit and comprises a fore spar 55, an aft spar 56, a plurality of laterally spaced cross ribs 57, a series of upper stringers 58, a series of lower stringers 59 and a skin 60. As shown in Figure 2, it is positioned or disposed so that it extends truly horizontal when the airplane is in a normal flying position. The leading edge of the section 31 extends or sweeps rearwards at approximately an angle of 74° with respect to the adjacent side portion of the fuselage. The fore spar 55 is in the form of a plate and extends or sweeps rearwards at approximately an angle of 80° with respect to said adjacent side portion of the fuselage. The aft spar 56 is also in the form of a plate and it extends at right angles to the fuselage. It is positioned an appreciable distance behind the fore spar 55 and carries at the ends thereof a pair of rearwardly extending brackets 61. An inner flap 62 is hinged to the brackets 61 and constitutes the trailing portion of the inner section 31. It is rectangular when viewed from above and is so designed that the trailing edge thereof is truly normal to the fuselage of the airplane. The cross ribs 57 are positioned in laterally spaced relation and comprise nose parts 57ᵃ, intermediate parts 57ᵇ and rear parts (not shown). The nose or front parts 57ᵃ of the cross ribs are bolted to, and project forwardly from, the fore spar 55. They support or carry the upper and lower stringers 58 and 59 and have curved front ends. The intermediate parts 57ᵇ of the cross ribs extend between, and serve to space apart, the fore and aft spars 55 and 56. A bracket 63 extends between, and is secured to, two of the front parts 57ᵃ of the cross ribs and this bracket carries one of the arms 29 of the landing gear 20. The wheel which is carried by the distal end of said one arm is adapted to fit within a well 64 when the arm is in its retracted position. As shown in Figure 4, the well is defined by a circular structural element 65 which is located between the central portions of the fore and aft spars. The upper stringers 58 extend from one end of the inner section 31 to the other end and are of the hat section type. They fit within notches or cutouts in the front parts 57ᵃ of the cross ribs 57 and embody side flanges at the top. The lower stringers 59, like the upper stringers, are of hat section type. They extend parallel to the upper stringers and fit within notches or cutouts in the lower portions of the front part 57ᵃ. The side flanges of the lower stringers are located at the bottom of the stringers and are flush with said lower portions of the front parts 57ᵃ. The fore spar 55, the front parts 57ᵃ of the cross ribs and the upper and lower stringers 58 and 59 constitute the primary load carrying structure or elements of the inner section 31. Certain of the stringers are cut off and others are cut away in order that the reenforcement which is afforded by the stringers progressively decreases from the inner ends of the stringers to the outer ends. By forming the inner section 31 of the wing structure so that the leading edge and the main or primary load carrying elements sweep rearwards at an acute angle with respect to the fuselage it is possible to position the inboard section 30 in front of the center of gravity of the airplane. By so positioning the inboard section of the wing structure the compartment 21 or useful load may be positioned most advantageously so far as the center of gravity is concerned while at the same time employing a fuselage of minimum height. The skin 60 of the inner section 31 of the wing structure comprises a fore or nose part 60ᵃ and a pair of plates 60ᵇ and 60ᶜ. The nose part 60ᵃ is U-shaped in cross section and extends around the upper and lower stringers 58 and 59 and the front parts 57ᵃ of the cross ribs 57. It is riveted to the side flanges of the last mentioned stringers and is preferably in the form of light sheet metal. The front portion of the inner end of the inner section 31 of the wing structure is removably secured to the adjacent end of the inboard section 30 by way of an upper angle bar 66 and a lower angle bar 67. The upper angle bar is shaped conformably to the inner front portion of the inner section 31 and comprises a substantially horizontal bottom leg and an upstanding side leg. The bottom leg fits against the upper portion of the inner margin of the fore or nose part 60ᵃ of the skin 60 and is riveted or otherwise fixedly secured in place. The upstanding side leg of the angle bar 66 abuts against the upstanding side leg of the upper angle bar 46 of the inboard section 30 of the wing structure. Bolts 68 extend through aligned holes in the two last mentioned legs and serve releasably or removably to secure the upper angle bars 66 and 46 together. The lower angle bar 67 underlies the upper angle bar 66 and consists of a substantially horizontal top leg and a depending side leg. The top leg of the angle bar 67 underlies the lower portion of the inner margin of the front part 60ᵃ of the skin 60 and is fixedly secured in place by way of rivets which extend through the skin and the side flanges of the lower stringers 59. The depending side leg of the angle bar 67 is shaped conformably to, and abuts against, the depending side leg of the lower angle bar 48 of the inboard section 30 and is removably secured thereto by way of bolts 69. The latter extend through aligned holes in the depending side legs of the angle bars 67 and 48. A flange equipped substantially semicircular nose piece 70 extends between, and is secured to, the front ends of the angle bars 66 and 67. This piece serves to support the front inner portion of the front part 60ᵃ of the skin 60 and is connected to the side leg of the front angle bar 50 of the inboard section by way of a plate 71 (see Figures 8 and 9). The inner end of the fore spar 55 abuts against, and is bolted to, the outer ends of the attaching plates 52 and 53, as shown in Figure 6. It is also bolted or otherwise secured to the outer margin of the gusset type plate 54 which extends between the attaching plates 52 and 53 and is secured to the rear leg of the rear angle bar 49 of the inboard section 30. A U-shaped fairing strip 72 of arcuate cross section extends around the inner end of the section 31. This strip serves to house or cover the upper and lower angle bars 66 and 67 and is suitably secured to the section 31 and the adjacent side portion of the fuselage 17. The intermediate and rear portions of the inner end of the section 31 lap the adjacent part of the fuselage. They are located rearwards of the inboard section 30 and are removably secured to the fuselage in any desired or practical manner. The outer front corner of the inner section 31 is reenforced or strengthened by way of an upper angle bar 73 and a lower angle bar 74. The upper angle bar is horizontally aligned with the upper angle bar 66 on the front inner corner portion of the section 31 and consists of a substantially horizontal leg and an upstanding side leg. The horizontal leg of the angle bar 72 overlies the upper portion of the outer margin of the front part 60ª of the skin 60 and is secured in place by way of rivets which pass through the front part 60ª and a flange on the front part 57ª of the subjacent cross rib 57. The lower angle bar 74 underlies the upper angle bar 73 and consists of a substantially horizontal top leg and a depending side leg. The top leg underlies the lower portion of the outer margin of the skin part 60ª and is riveted in place. The depending side leg of the angle bar 74 is aligned with the side leg of the upper angle bar 73. The two angle bars 73 and 74 in addition to reenforcing the outer front corner portion of the inner section 31 of the wing structure constitute part of the means for removably securing the outer section 33 to the inner section 31.

The inner section 32 of the wing structure is of the same design and construction as the inner section 31 except that it is in the form of a complement. It is symmetrical in all respects and is joined to the right hand end of the inboard section 30 in the same manner that the inner section 31 is joined to the left hand end of the inboard section. As shown in Figure 1, the leading edge of the inner section 32 sweeps or extends rearwards at approximately an angle of 74° with respect to the adjacent or contiguous side portion of the fuselage. An inner flap 75 is hinged to, and forms a part of, the inner section 32 and has a trailing edge which is truly normal to the fuselage 17.

The outer section 33 of the wing structure is located outwardly of the inner section 31 and is joined to the latter as hereinafter described. It extends upwards so that it has a dihedral of approximately 11° with respect to the horizontal. The leading edge of the outer section 33 is straight and is substantially truly normal to the fuselage 17 and the line of flight of the airplane with the result that any tendency on the part of the wing structure as a whole to tip-stall is eliminated. An outer flap 76 is hinged to, and forms a part of, the inner rear portion of the outer section 33 and an aileron 77 is hinged to, and forms a part of, the outer rear portion of said section. The trailing edges of the outer flap 76 and the aileron extend or sweep forwards at approximately a 74° angle with respect to the fuselage. As its main or primary parts the outer section 33 comprises a fore spar 78, a rear spar (not shown), cross ribs 79, upper longitudinally extending stringers 80 and 81, lower longitudinally extending stringers 82 and 83, and a skin 84. The fore spar extends outwards from the outer end of the fore spar 55 of the inner section 31 of the wing structure and projects forwards at approximately an angle of 84° with respect to the fuselage. It is in the form of a metallic plate and tapers from the inner end thereof to its outer end. The aft spar projects outwards from the outer end of the aft spar 56 of the section 31. The cross ribs 79 are in laterally spaced relation and comprise front or nose parts 79ª and intermediate parts 79ᵇ. The intermediate parts of the crossribs extend between and serve to space apart the fore and aft spars of the outer section 33. The nose or front parts 79ª are secured to, and project forwards from, the fore spar 78. The upper stringers 80 are located at the inner end of the section 33. They are of the hat section type or variety and are disposed in laterally spaced relation, as shown in Figure 5. The stringers 81 are located at, and extend longitudinally of, the front outer portion of the section 33. They are disposed in laterally spaced relation and are disposed in front of the spar 78. The stringers 80 are also located in front of the fore spar 78. They are mounted in cutouts or notches in the innermost nose parts 79ª of the cross ribs and are arranged so that the side flanges thereof are at the top. The stringers 81 are mounted in cutouts or notches in the outermost front parts 79ª and have portions thereof cut off and other portions cut away in order that they progressively decrease in strength and weight from the inner ends thereof to the outer ends. A bar 85 of T-shaped cross section serves to connect the outer ends of the stringers 80 to the inner ends of the stringers 81. This bar embodies side legs, as shown in Figure 16, and these overlie the adjacent ends of the side flanges of the stringers 80 and 81. The lower stringers 82 underlie, and correspond in length to, the upper stringers 80. They are located at the inner front portion of the outer section 33 and fit within notches or cutouts in the lower portions of the inner or nose parts 79ª. The lower stringers 83 underlie the upper stringers 81 and are similar in design and construction to the latter. They are disposed in cutouts in the lower portions of the outermost nose or front parts 79ª and are cut away and cut off so that they, like the stringers 81, progressively decrease in strength and weight from their inner ends to their outer ends. A T type bar 86 serves to connect the outer ends of the lower stringers 80 and the inner ends of the stringers 81. The fore spar 78, the nose or front parts 79ª of the cross ribs 79 and the stringers 80, 81, 82 and 83 constitute the primary load carrying structure or elements of the outer section 33 and this, due to the construction and design of the stringers, progressively decreases in strength from the inner or root portion of the section 33 to the outer end or tip. The skin 84 of the outer section 33 consists of a nose part 84ª of U-shaped cross section and a pair of vertically spaced plates 84ᵇ and 84ᶜ. The nose part surrounds the upper and lower stringers and is riveted to the side flanges of the latter. The plates 84ᵇ and 84ᶜ overlie and underlie, respectively, the intermediate parts 79ᵇ of the cross ribs. The inner front corner portion of the outer section 33 is strengthened or reenforced by means of an upper angle bar 87 and a lower angle bar 88. The upper bar comprises a substantially horizontal bottom leg and an upstanding side leg. The bottom leg overlies the upper portion of the inner margin of the nose part 84ª of the skin and is fixedly secured in place by way of rivets which pass through said portion and the inner ends of the side flanges of the stringers 80. The upstanding side leg abuts against the upstanding side leg of the upper angle bar 73 and is removably secured to such leg by way of bolts 89. The latter extend through aligned holes in the side legs of the two angle bars 73 and 87. The lower angle bar 88 underlies the upper angle bar 87 and consists of a substantially horizontal top leg and a depending side leg. The top leg underlies the inner ends of the lower stringers 82 and is secured in place by way of rivets which extend through the side flanges of the last mentioned stringers. The side leg abuts against the depending side leg of the lower angle bar 74 of the inner section 31 and is removably secured to the latter leg by way of bolts 90 which pass through aligned holes in the two side legs. A U-shaped fairing strip 91 extends around and serves to house or cover the upper angle bars 73 and 87 and the lower angle bars 74 and 88. In addition to the parts heretofore mentioned the outer section 33 comprises a tip 92. The latter is secured to the outer ends of the fore and aft spars of said section 33 and has a navigation light 93 in its front end.

The outer section 34 of the wing structure is the same in design and construction as the outer section 33 except that it is in the form of a complement of the latter. It is removably secured to the outer end of the inner section 32 in the same manner as the section 33 is secured to the inner section 31. The rear or trailing portion of the section 34 comprises an outer flap 94 and an aileron 95. The flap 94 is located at the inner portion of the rear part of the section 34 whereas the aileron 95 is located along the outer rear portion of said section 34.

The herein described wing structure effectively and efficiently fulfills its intended purpose and is characterized by the fact that the rearward sweep of the leading portions of the inner sections makes it possible to position the inboard section or part 30 sufficiently in front of the center of gravity of the airplane to permit of the most favorable disposition of the useful load or the compartment 21 without necessitating any undue increase in the height of the fuselage. By reason of the fact that the outer sections 33 and 34 are removably connected to the outer ends of the inner sections 31 and 32 and the inner sections are removably connected to the ends of the inboard section 30 the structure as a whole may be readily dismantled when desired.

Whereas the improved wing structure has been described and illustrated in connection with a low-wing airplane it is to be understood that it may be used equally as well in connection with a high-wing or mid-wing type airplane. It is also to be understood that although the specific wing structure shown includes a separate or distinct inboard section the invention comprehends a wing structure wherein the inner ends of the primary load carrying elements of the inner sections project into the fuselage and are directly connected together since such a structure is within the purview of the invention and has the same inherent advantage as the structure which is specifically disclosed and described. In addition the invention is not to be restricted to the details set forth since these may be modified within the scope of the appended claims without departing from the spirit and scope of the invention.

Having thus described the invention what I claim as new and desire to secure by Letters Patent is:

1. An airplane comprising a fuselage elongated fore and aft and having propulsion means associated therewith and in addition a load carrying space within the central portion thereof and extending forwards to a point slightly beyond the center of gravity of the airplane, and a wing structure for supporting the airplane during flight including a unitary inboard section formed of a plurality of rigidly connected structural elements and extending transversely across the front portion of the fuselage at a point ahead of said load carrying space, and a pair of complemental side sections projecting outwardly in opposite directions from the fuselage sides and provided with a plurality of longitudinally extending primary load carrying structural elements disposed immediately adjacent the leading edges of said side sections and having the inner parts thereof joined to the ends of the inboard section and sweeping or extending rearwards at an acute angle with respect to said fuselage sides.

2. An airplane comprising a fuselage with propulsion means associated therewith, and a wing structure for supporting the airplane during flight including a pair of complemental side sections projecting outwardly in opposite directions from the fuselage sides and provided with a plurality of longitudinally extending primary load carrying structural elements disposed immediately adjacent the leading edges of the side sections and having the inner ends thereof joined together within the fuselage at a point ahead of the center of gravity of the airplane and their inner parts sweeping or extending rearwards at an acute angle with respect to said fuselage, the outer portions of the leading edges of said side sections extending at right angles to the line of flight of the airplane.

3. An airplane comprising a fuselage with propulsion means associated therewith, and a wing structure for supporting the airplane during flight including a unitary box-like inboard section comprising a plurality of rigidly connected structural elements and extending transversely across the fuselage at a point ahead of the center of gravity of the airplane and a pair of complemental side sections projecting outwardly in opposite directions from the fuselage sides and provided with a plurality of longitudinally extending primary load carrying structural elements disposed immediately adjacent and along the leading edges of the side sections and having the inner parts thereof joined to the ends of the inboard section respectively and sweeping or extending rearwards at an acute angle with respect to the fuselage, the inner portions of the leading edges of the side sections extending rearwards at approximately an angle of 74° with respect to the fuselage and the outer portions of said leading edges extending truly normal to the line of flight of the airplane.

4. An airplane comprising a fuselage with propulsion means associated therewith, and a wing structure for supporting the airplane during flight including an inboard section extending transversely across the fuselage at a point ahead of the center of gravity of the airplane and a pair of complemental side sections projecting outwardly in opposite directions from the fuselage sides and provided with a plurality of longitudinally extending primary load carrying structural elements disposed immediately adjacent the leading edges of the side sections and having the inner parts thereof joined to the ends of the inboard section and sweeping or extending rearwards at an acute angle with respect to the fuselage sides, the inner portions of the side sections of the wing structure extending substantially horizontally during normal flight of the airplane and having the leading edges extending at approximately an acute angle of 74° with respect to the fuselage and the outer portions of said side sections extending upwards at a positive dihedral angle wtih respect to said inner portions and having the leading edges thereof truly normal to said fuselage sides and the line of flight of the airplane.

5. An airplane comprising a fuselage with propulsion means associated therewith, and a wing structure for supporting the airplane during flight including a unitary box-like inboard section formed of a plurality of rigidly connected structural elements and extending transversely across and disposed within the fuselage at a point in front of the center of gravity of the airplane, and a pair of complemental side sections projecting outwardly in opposite directions from the fuselage sides and provided with longitudinally extending primary load carrying structural elements disposed immediately adjacent the leading edges of the side sections and having the inner parts thereof joined to the ends of the inboard section and sweeping or extending rearwards at an acute angle with respect to said fuselage sides, the outer portions of the leading edges of the side sections being truly normal to the sides of the fuselage and the line of flight of the airplane.

6. An airplane comprising a fuselage elongated fore and aft and having an empennage at the rear end thereof, and in addition a load carrying space within the central portion thereof and extending forwards to a point slightly beyond the center of gravity of the airplane, propulsion means associated with the fuselage, and a wing structure for supporting the airplane during flight including a unitary box-like inboard section formed of a plurality of rigidly connected structural elements and extending transversely across, and disposed within, the fuselage at a point ahead of said space, and a pair of complemental side sections projecting outwardly in opposite directions from the fuselage sides and embodying a plurality of longitudinally extending primary load carrying structural elements disposed immediately adjacent the leading edges of the side sections and having the inner parts thereof joined to the ends of the inboard section and sweeping or extending rearwards at an acute angle with respect to the fuselage sides, the inner portions of the side sections of the wing structure extending substantially horizontally when the airplane is in normal flight and having the leading edges thereof extending at approximately an angle of 74° with respect to the fuselage sides and the outer portions of said side sections extending upwards at a dihedral angle with respect to said inner portions and having their leading edges truly normal to said fuselage sides and the line of flight of the airplane.

7. An airplane comprising a fuselage with propulsion means associated therewith, and a wing structure for supporting the airplane during flight embodying a pair of complemental side sections projecting outwardly in opposite directions from the fuselage and provided with longitudinally extending primary load carrying elements disposed immediately adjacent the leading edges of the side sections and having the inner ends thereof connected together within the fuselage at a point ahead of the center of gravity of the airplane and their inner parts sweeping or extending rearwards at an acute angle with respect to the fuselage, the outer portions of the leading edges of the side sections of the wing structure and the inner portions of the trailing edges of said side sections being normal to the fuselage and the line of flight of the airplane.

8. An airplane comprising a fuselage with propulsion means associated therewith, and a wing structure for supporting the airplane during flight including an inboard section extending transversely across and disposed within the fuselage at a point in front of the center of gravity of the airplane, and a pair of complemental side sections projecting outwardly in opposite directions from the fuselage sides and embodying a plurality of longitudinally extending primary load carrying elements disposed immediately adjacent the leading edges of the side sections and having the inner parts thereof joined to the ends of the inboard section and sweeping or extending rearwards at an acute angle with respect to said fuselage sides, the outer portions of the leading edges of the side sections of the wing structure and the inner portions of the trailing edges of said side sections being truly normal to the sides of the fuselage and the line of flight of the airplane.

9. An airplane of the low wing monoplane type comprising a fuselage with propulsion means associated therewith, and a wing structure for supporting the airplane during flight embodying a pair of complemental side sections projecting outwardly in opposite directions from the fuselage and provided with longitudinally extending primary load carrying structural elements disposed immediately adjacent the leading edges of the side sections and having the inner parts thereof cross connected within the fuselage at a point ahead of the center of gravity of the airplane and sweeping or extending rearwards at an acute angle with respect to the fuselage sides, the outer portions of said leading edges of the side sections and the inner portions of the trailing edges of said side sections extending substantially at right angles to the fuselage and the outer portions of said trailing edges sweeping or extending forwards at an acute angle with respect to the fuselage.

10. An airplane of the low wing monoplane type comprising a fuselage with propulsion means associated therewith, and a wing structure for supporting the airplane during flight embodying a pair of complemental side sections projecting outwardly in opposite directions from the fuselage and provided with a plurality of longitudinally extending primary load carrying structural elements disposed immediately adjacent the leading edges of the side sections and having the inner parts thereof connected together within the fuselage at a point ahead of the center of gravity of the airplane and sweeping or extending rearwards at an acute angle with respect to the fuselage sides, the inner portions of the leading edges of the side sections sweeping or extending rearwards at approximately an angle of 74° with respect to the fuselage, the outer portions of said leading edges of the side sections and the inner portions of the trailing edges of said side sections extending substantially at right angles to the fuselage and the outer portions of said trailing edges extending or sweeping forwards at an angle corresponding to the acute angle at which said inner portions of the leading edges sweep rearwards.

11. An airplane of the low wing monoplane type comprising a fuselage with propulsion means associated therewith, and a wing structure for supporting the airplane during flight embodying a unitary box-like inboard section formed of a plurality of rigidly connected structural elements and extending transversely across, and disposed in, the fuselage at a point ahead of the center of gravity of the airplane, and a pair of complemental side sections projecting outwardly in opposite directions from the fuselage sides and provided with a plurality of longitudinally extending primary load carrying structural elements disposed immediately adjacent the leading edges of the side sections and having the inner parts thereof joined to the ends of the inboard section and sweeping or extending rearwards at an acute angle with respect to the fuselage sides, the inner portions of the leading edges of the side sections extending or sweeping rearwards at approximately an angle of 74° with respect to the fuselage sides, the outer portions of said leading edges and the inner portions of the trailing edges of said side sections extending substantially at right angles to the sides of the fuselage and the outer portions of said trailing edges extending or sweeping forwards at an angle corresponding to the acute angle at which said inner portions of the leading edges sweep rearwards.

12. An airplane comprising a fuselage with propulsion means associated therewith, and a wing structure for supporting the airplane during flight embodying a unitary box-like inboard section formed of a plurality of rigidly connected structural elements and extending transversely across, and disposed within, the fuselage at a point in front of the center of gravity of the airplane, and a pair of complemental side sections projecting outwardly in opposite directions from the fuselage sides and having a plurality of longitudinally extending primary load carrying structural elements adjacent and closely following the leading edges thereof, joined at their inner ends to the ends of said inboard section and progressively and collectively decreasing in strength and width from their inner ends to their outer ends, and in addition having the inner portions of said leading edges sweeping or extending rearwards at an acute angle with respect to the fuselage.

13. An airplane comprising a fuselage with propulsion means associated therewith, and a wing structure for supporting the airplane during flight embodying a unitary box-like inboard section formed of a plurality of rigidly connected structural elements and extending transversely across, and disposed within, the fuselage at a point in front of the center of gravity of the airplane, and a pair of complemental side sections projecting outwardly in opposite directions from the fuselage sides and having a plurality of longitudinally extending primary load carrying structural elements adjacent and closely following the leading edges thereof, joined at their inner ends to the ends of said inboard section and progressively and collectively decreasing in strength and width from their inner ends to their outer ends, and in addition having the inner portions of said leading edges sweeping or extending rearwards at an acute angle with respect to the fuselage and the outer portions of said leading edges extending at right angles to said fuselage sides and the line of flight of the airplane.

14. An airplane comprising a fuselage with propulsion means associated therewith, and a wing structure for supporting the airplane during flight, including a unitary box-like inboard section formed of a plurality of rigidly connected structural elements and extending transversely across, and disposed substantially entirely within, the fuselage, a pair of complemental unitary inner sections projecting outwards in opposite directions from the fuselage and embodying a plurality of longitudinally extending primary load carrying structural elements disposed immediately adjacent the leading edges of the inner sections, having the inner ends thereof removably connected to the ends of the inboard section, and extending or sweeping rearwards at an acute angle with respect to the fuselage, and a pair of complemental unitary outer sections removably secured to, and projecting outwardly from, the outer ends of the inner sections.

15. An airplane comprising a fuselage with propulsion means associated therewith, and a wing structure for supporting the airplane during flight, including a unitary box-like inboard section formed of a plurality of rigidly connected structural elements and extending transversely across, and disposed substantially entirely within, the fuselage, a pair of complemental unitary inner sections projecting outwards in opposite directions from the fuselage and embodying a plurality of longitudinally extending primary load carrying structural elements disposed immediately adjacent the leading edges of the inner sections, having the inner ends thereof removably connected to the ends of the inboard section, and extending or sweeping rearwards at an acute angle with respect to the fuselage, and a pair of unitary complemental outer sections having the leading edges thereof extending at right angles to the fuselage and embodying a plurality of longitudinally extending primary load carrying elements disposed immediately adjacent the leading edges of said outer sections and removably connected at their inner ends to the outer ends of said structural elements of the inner sections.

16. An airplane comprising a fuselage with propulsion means associated therewith, and a wing structure for supporting the airplane during flight, including a unitary box-like inboard section formed of a plurality of rigidly connected structural elements and extending transversely across, and disposed substantially entirely within, the fuselage, a pair of complemental unitary inner sections projecting outwards in opposite directions from the fuselage sides, constructed and arranged so that they extend substantially horizontally during normal flight of the airplane, and embodying a plurality of longitudinally extending primary load carrying structural elements disposed immediately adjacent the leading edges of the inner sections, having the inner ends thereof removably connected to the ends of the inboard section, and extending or sweeping rearwards at an acute angle with respect to the fuselage, and a pair of unitary complemental outer sections disposed outwardly of, and canted upwards with respect to, the inner sections, having the leading edges thereof extending at right angles to the fuselage sides, and embodying a plurality of longitudinally extending primary load carrying structural elements disposed immediately adjacent the leading edges of the outer sections and joined at their inner ends to the outer ends of said structural elements of the inner sections.

17. An airplane comprising a fuselage with propulsion means therefor, and a wing structure for supporting the airplane during flight, embodying a pair of complemental unitary inner wing sections projecting outwards in opposite directions from the fuselage, having the leading edges extending or sweeping rearwards at approximately an angle of 74° with respect to the fuselage sides and the trailing edges thereof extending substantially at right angles to the fuselage, and embodying a plurality of longitudinally extending primary load carrying structural elements disposed immediately adjacent and closely following said leading edges of the inner sections and having the inner ends thereof joined together within the fuselage at a point in front of the center of gravity of the airplane, and a pair of unitary complemental outer sections having the leading edges thereof extending at right angles to said fuselage sides, removably connected at their inner ends to the outer ends of the inner sections, and having the trailing edges thereof extending or sweeping forwards at an acute angle corresponding substantially to that at which the leading edges of the inner sections sweep rearwards with respect to the fuselage sides.

18. An airplane comprising a fuselage with propulsion means associated therewith, and a wing structure for supporting the airplane during flight, embodying a unitary box-like inboard section formed of a plurality of rigidly connected structural elements and extending transversely across, and dispensed within, the fuselage at a point in front of the center of gravity of the airplane, a pair of complemental unitary inner sections projecting outwards in opposite directions from the fuselage, having the leading edges thereof extending or sweeping rearwards at an acute angle with respect to said fuselage and the trailing edges thereof extending substantially at right angles to the fuselage, and embodying a plurality of longitudinally extending primary load carrying structural elements disposed immediately adjacent and closely following the leading edges of the inner sections and having the inner ends thereof connected removably to the ends of the inboard section, and a pair of unitary complemental outer sections having the leading edges thereof extending substantially at right angles to the fuselage, removably connected at their inner ends to the outer ends of the inner sections, and having their trailing edges extending or sweeping forwards at an acute angle corresponding substantially to that at which the leading edges of the inner sections sweep rearwards with respect to the fuselage.

19. An airplane comprising a fuselage elongated fore and aft and having an ampennage at the rear end thereof, propulsion means associated with the fuselage, and a wing structure for supporting the airplane during flight, including a rigid unitary inboard section extending transversely across, and disposed within, the fuselage at a point in front of the center of gravity of the airplane, a pair of complemental unitary inner sections projecting outwards in opposite directions from the fuselage sides, having the leading portions thereof joined to the ends of the inboard section respectively, and extending or sweeping rearwards at an acute angle with respect to the fuselage, and in addition having the trailing portions thereof extending substantially at right angles to the fuselage and provided with inner flaps, and a pair of complemental unitary outer sections secured to, and projecting outwardly from, the outer ends of the inner sections and having the leading portions thereof extending substantially at right angles to the fuselage and their trailing portions extending or sweeping forwards at an acute angle relatively to the fuselage sides and provided with outer flaps and ailerons in side by side relation.

ALFRED J. KLOSE.